United States Patent
Wood et al.

(10) Patent No.: US 8,604,969 B2
(45) Date of Patent: Dec. 10, 2013

(54) SYSTEM AND METHOD OF USING IMAGE GRIDS IN DETECTION OF DISCRETE OBJECTS

(75) Inventors: Thomas E. Wood, Portsmouth, RI (US);
Douglas W. Arent, Portsmouth, RI (US);
Charles M. Ciany, Newport, RI (US);
Clifford M Curtis, Portsmouth, RI (US); Thomas B. Pederson, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 368 days.

(21) Appl. No.: 12/753,955

(22) Filed: Apr. 5, 2010

(65) Prior Publication Data
US 2011/0241930 A1    Oct. 6, 2011

(51) Int. Cl.
*G01S 13/00*    (2006.01)

(52) U.S. Cl.
USPC .............................. 342/93; 342/90; 342/191

(58) Field of Classification Search
USPC ............................... 342/90, 93, 191
See application file for complete search history.

(56) References Cited

U.S. PATENT DOCUMENTS

| | | | |
|---|---|---|---|
| 6,173,066 B1 * | 1/2001 | Peurach et al. | 382/103 |
| 7,397,415 B1 * | 7/2008 | Wang et al. | 342/13 |
| 2007/0139251 A1 * | 6/2007 | Shu | 342/25 R |
| 2007/0183669 A1 * | 8/2007 | Owechko et al. | 382/224 |
| 2008/0303712 A1 * | 12/2008 | Bruyere et al. | 342/25 E |

* cited by examiner

*Primary Examiner* — Timothy A Brainard
(74) *Attorney, Agent, or Firm* — Pierce Atwood LLP; Joseph M. Maraia

(57) ABSTRACT

A sensor is used to identify detections of discrete objects in a search grid. An image grid of the detections is created. The image grid is analyzed to identify a pattern of detections. The pattern of detections is used to identify objects of interest.

23 Claims, 3 Drawing Sheets

SYSTEM AND METHOD OF USING IMAGE GRIDS IN DETECTION OF DISCRETE OBJECTS

TECHNICAL FIELD OF THE DISCLOSURE

This disclosure generally relates to detection systems and methods, and more particularly, to a system and method for using image grids in detection of discrete objects.

BACKGROUND OF THE DISCLOSURE

Surveillance sensors, such as those using sonar or radar, mounted on vehicles or ships may be used to identify objects of interest in a particular area. In highly cluttered environments, the false alarm rate of the sensor may exceed the desired rate and lead to a high number of false operator alerts and/or lost time in confirming detections. Attempts to eliminate false detections have resorted to a second post detection confirmation full sweep. A first pass is performed by a surveillance sensor to identify a possible initial detection of discrete objects in its field of view. A second pass is then performed by a high resolution sensor to confirm the detection or provide an indication that the initial detection was false. The second pass typically follows the same route as the first pass. Thus, time is lost in performance of the second pass.

SUMMARY OF THE DISCLOSURE

From the foregoing, it may be appreciated that a system for detection may be desired that saves time and conserves power consumption in detecting objects of interest while maintaining an ability to accurately detect the objects of interest and reduce false alarm occurrences. According to the present invention, a system and method for using image grids in detection of discrete objects are provided that substantially eliminate or greatly reduce disadvantages and problems associated with conventional detection systems.

In accordance with an embodiment of the invention, a method for using image grids in detection of discrete objects comprises using a sensor to identify detections in a search grid, creating an image grid of the detections, and analyzing the image grid to identify a pattern of detections.

Certain embodiments of the invention may provide one or more technical advantages over conventional detection systems. A potential technical advantage of some embodiments of the invention is the ability to conserve power consumption in detecting objects of interest while maintaining an ability to accurately target the objects of interest. Another technical advantage is to save time in detection by adjusting or eliminating the confirmation pass performed in conventional detection systems.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
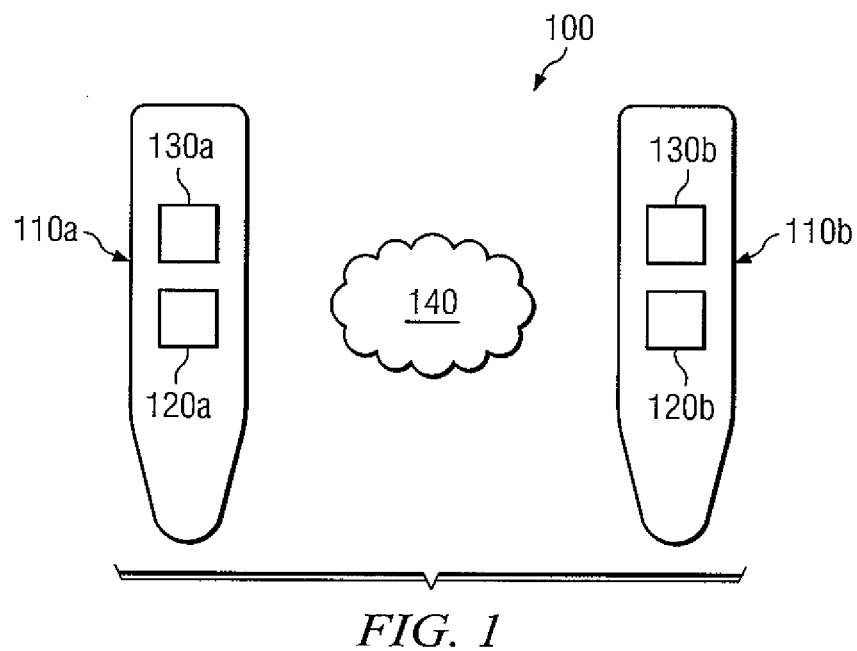
FIG. 1 illustrates an environment in which one embodiment of a system of using image grids in detection of discrete objects may operate.

FIG. 1 shows one embodiment of a system of using image grids in detection of discrete objects. Examples of a discrete objects is a string of bottom sea mines and fast radar targets, like aircraft, on a persistent Plan Position Indicator. Both kinds of target patterns cover a wide area in the sensor field of view, leaving the pattern not immediately recognized. For discussion purposes, the detection of mines will be described. However, any type of discrete object may be detected using the technique described herein and is not limited to the example being used for discussion purposes.

In operation, vehicle 110a traverses minefield 100 and performs a quick scan of the minefield 100 using a low resolution sensor 120a. Processor 130a of vehicle 110a forms image grids of the area detected and employs an algorithm such as the Hough transform to identify one or more pattern lines of objects detected. Certain discrete objects being detected provide a persistent pattern that can be recognizable from the generated image grid. The image grid provides a data structure for collecting persistent detections over a wide field of view. Vehicle 110a transfers information indicative of the location of the pattern lines of objects detected, as well as the location of objects not located on the pattern lines, to processor 130b of vehicle 110b over a network 140.

Using this information, vehicle 110b traverses the minefield along the identified pattern lines using a high resolution sensor 120b to both determine whether the objects detected by the sensor 120a are in fact mines and to potentially locate additional mines along the identified pattern lines. In this manner, vehicle 110b can go straight to the identified pattern lines for confirming the detection of the discrete objects and avoid duplicating the efforts of vehicle 110a.

After investigating the pattern lines identified by processor 130a, vehicle 110b may traverse the minefield 100 to confirm the identity of the objects detected by sensor 120a that are not located along the identified lines. Thus, by using image grids to identify lines of objects detected by sensor 120a, vehicle 110b may conserve its power consumption by prioritizing the order in which it investigates the objects detected by sensor 120a. Though shown as separate vehicles, vehicle 110a and vehicle 110b may be the same vehicle.

Vehicles 110a and 110b may be any suitable type of vehicle that is operable to traverse a minefield 100. In one embodiment, vehicles 110a and 110b may be autonomous underwater vehicles. Autonomous underwater vehicles may be used to traverse an area to determine whether there are any mines in that area. In one embodiment, vehicle 110a may traverse an entire minefield 100 to detect mine-like objects. Using information from vehicle 110a, vehicle 110b may traverse only select portions of minefield 100 to confirm the identity of the mine-like objects detected by vehicle 110a as well as to detect additional mines. In this manner, vehicle 110b may focus its efforts on traversing areas of the minefield identified as to be the likely location of mines. Vehicle 110b may conserve power consumption in confirming the identity of the mine-like objects detected by vehicle 110a. Additionally, vehicle 110b may target the likely locations of mines in order to detect mines that were undetected by vehicle 110a. Any objects confirmed as mines are then neutralized by vehicle 110b.

Sensors 120a and 120b may be any device that measures a physical quantity and converts it into a signal which can be read by an observer or by an instrument. Autonomous underwater vehicles may carry sensors to navigate autonomously and map features of the ocean. In some embodiments, sensors 120a and 120b locate mine-like objects using sonar by employing sound propagation to detect other objects. In one embodiment, vehicle 110a uses a low resolution sensor 120a for conducting an initial scan of the minefield 100, and vehicle 110b uses a high resolution sensor 120b for confirming the identity of the objects detected by sensor 120a and for detecting additional mine-like objects.

Processors 130a and 130b may be microprocessors, controllers, or any other suitable computing devices, resources, or combinations of hardware, software, and/or encoded logic operable to provide, either alone or in conjunction with other components, detection using image grids. Processor 130a may adjust the size/resolution of the image grids according to a variety of factors. Processor 130a may also use an algorithm such as the Hough transform to identify pattern lines of mine-like objects detected by a sensor 120a. Processor 130b may instruct vehicle 110b to traverse particular sections of the minefield based on results achieved by vehicle 110a. In some applications, the further sweep by vehicle 110b may be eliminated.

Network 140 represents any suitable combination and arrangement of components supporting communications between vehicles 110a and 110b.

Figure 2:
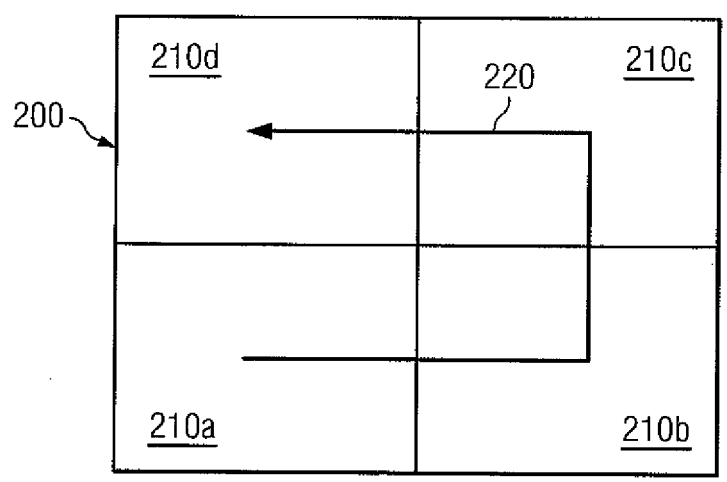
FIG. 2 illustrates a diagram showing an embodiment of an arrangement of search grids used in detection.

FIG. 2 illustrates a diagram showing an embodiment of an arrangement of search grids used in a system for detection. Generally, minefield 200 is divided into four search grids 210a, 210b, 210c, and 210d for traversal by a first vehicle via path 220. The first vehicle traverses the search grids in the order conveyed by path 220 and creates an image grid for each search grid traversed. Each search grid 210 is traversed one at a time to produce one image grid. The first vehicle then performs an image processing algorithm, such as a Hough transform, on each image grid to identify pattern lines of mine-like objects. Although the first vehicle is illustrated as traversing the minefield in the manner denoted by path 220, the first vehicle may traverse the minefield in any suitable manner.

Search grid 210 may be a division of any size of minefield 200. Generally, large search grids are preferable, as using large search grids and image grids increases the likelihood of the identification of pattern lines of mine-like objects within an image grid. The size of a search grid 210, and in turn a number of pixels making up the image grid, is adjustable based on a variety of factors, including a coverage area, a resolution size of the sensor of the first vehicle, a false alarm rate of the sensor of the first vehicle, and a processing power needed to operate the algorithm to identify the pattern lines of mine-like objects. The location of a mine-like object is identified by the search vehicle in a search grid with a resolution independent of the image grid. Through a sweep pass of a search grid, a portion of an image grid is discovered over time. The image grid may be dynamically adjusted during the search process in response to up to the minute search results.

The false alarm rate is the density of false alarms within a two-dimensional area. By way of example, if the false alarm rate is low, the search grids may have a relatively large size in order to increase the likelihood of identifying pattern lines of mine-like objects. The image grid is of a coarser resolution but covers a broader area. By covering a broader area, the likelihood of detecting the pattern lines is enhanced. This enhancement is achieved with post-detection false alarm reduction through image processing or pattern recognition. On the other hand, if the false alarm rate of the sensor of the first vehicle is high, the image grids may be relatively small to decrease the number of false alarms detected within each search grid but adversely affect recognition of patterns of detected objects.

Figure 3:
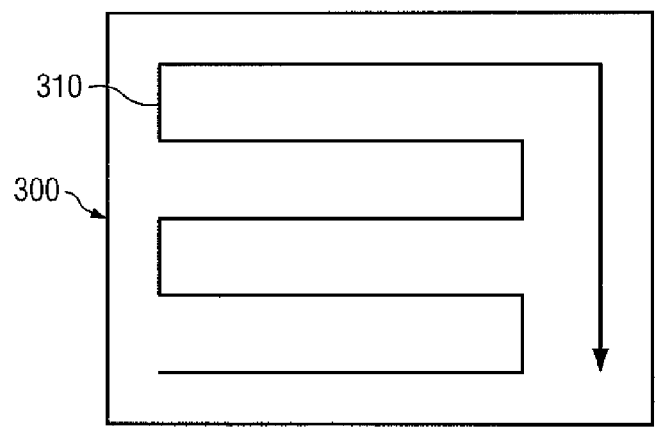
FIG. 3 illustrates a diagram showing an embodiment of a path a vehicle may take through a search grid used in detection of discrete objects.

FIG. 3 illustrates a diagram showing an embodiment of the path a first vehicle may take through a search grid used in a system for detection. A first vehicle may travel along path 310 through search grid 300 using its sensor to detect mine-like objects. Path 310 may denote a raster scan-like progression in which the first vehicle traverses search grid 300 by moving back and forth along adjacent strips of the search grid. The spacing of the rows of path 310 is dependent on the effective detection range of the sensor mounted on the first vehicle. After traversing the entire area of the search grid 300, the first vehicle may return to a similar position of an adjacent search grid in order to traverse the adjacent search grid. Although path 310 is illustrated as traversing search grid 300 in a particular manner, the first vehicle may traverse the search grid 300 in any manner suitable for efficiently traversing the search grid.

Figure 4A:
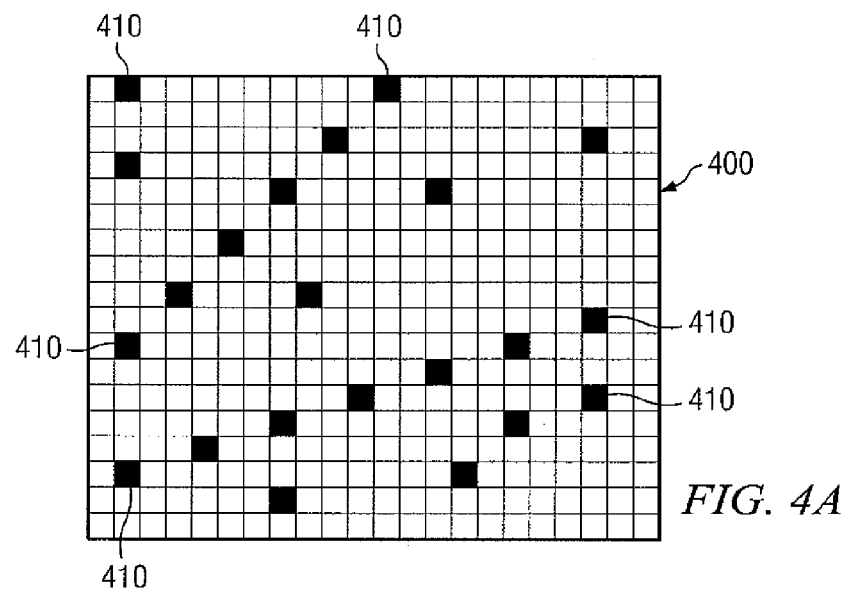
FIGS. 4A-4B illustrate an embodiment of an image grid that may be used in detection.
Figure 4B:
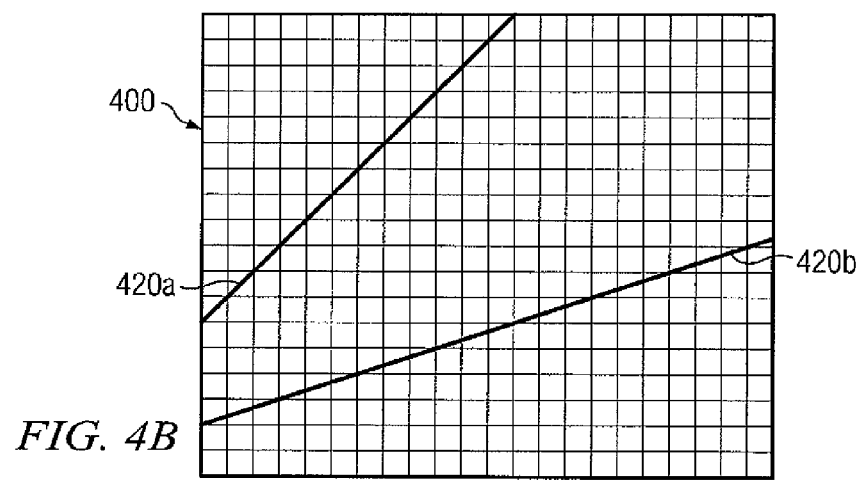

FIGS. 4A-4B illustrate an embodiment of an image grid that may be used in a system for detection. After a first vehicle traverses a search grid of a particular minefield, a processor on the first vehicle creates an image grid 400 containing the detections 410 of the first vehicle. The processor then employs an image processing algorithm, such as a Hough transform, to identify pattern lines 420a and 420b of detections. The Hough transform detects pattern lines in images and finds edges in a multi-gray scale image. In image grid 400, the detections already form a binary image so that edge detection is not necessary. The Hough transform can be used to detect broken pattern lines where objects within a particular pattern line may go undetected due to blockage or noise but a pattern line can still be determined from the detections identified in a sweep. the Hough transform provides all the parameters to uniquely determine the pattern line, its slope, and y-intercept.

Image grid 400 may be a visual representation of a mathematical matrix of detections within a particular search grid. As discussed below, image grid 400 may also be a visual representation of a mathematical matrix of detections spanning portions of two or more adjacent search grids. Image grid 400 comprises coordinate locations. If there is no detection in the section of the search grid corresponding to a particular coordinate location on the image grid, the corresponding matrix entry is a 0. On the other hand, if there is a detection in the section of the search grid corresponding to a particular coordinate location on the image grid, the corresponding matrix entry is a non-zero value representing the probability that the detection is actually from an object of interest.

After assigning values to the locations on the image grid, the processor of the first vehicle performs an imaging processing algorithm, such as the Hough transform, on the data to identify a pattern line of detections, such as lines 420a and 420b of FIG. 4B. In one embodiment, the first vehicle is used to detect mines on the ocean floor, and a second vehicle is used to confirm the detections of the first vehicle. Since the ships that are used to drop mines typically travel in a linear fashion, mines are typically found in a straight line. Thus, detected mine-like objects arranged linearly are more likely to be mines than those mine-like objects not arranged linearly. Mine-like objects not arranged in a linear manner are more likely not to be mines and considered false alarms. By utilizing pattern lines of mine-like objects identified within an image grid, a second vehicle may focus its efforts on locations more likely to contain mines. In one embodiment, the second vehicle traverses a path spanning the entire minefield and containing the pattern line identified by the processor of the first vehicle. Thus, the second vehicle not only traverses the gaps between the detected mine-like objects of the first vehicle, but the second vehicle also traverses locations along the line extending outward from the detected mine-like objects of the first vehicle. In this manner, the second vehicle may be able to detect mines that were undetected by the first vehicle. Additionally, the second vehicle may focus its efforts on confirming the identity of mine-like objects that are more likely to be mines.

Though lines 420a and 420b are illustrated in FIG. 4B, the processor of the first vehicle may be able to identify other pattern arrangements of detected objects of interest. In one embodiment, a modified Hough transform may be used to identify a pattern of detections arranged in a curved fashion, such as a parabola or hyperbola. In another embodiment, a weighted Hough transform may be used to incorporate the probability that each detection is actually an object of interest. For example, the sensor of the first vehicle may have criteria for determining the likelihood that a detection is actually an object of interest. If there is a detection in the section of the search grid corresponding to a particular coordinate location on the image grid, the corresponding matrix entry may be a non-zero number representing the probability that the detection is actually an object of interest. The Hough transform applied by the processor of the first vehicle will take into account not only the location of a detection but also the probability value that the detection is actually a mine.

Figure 5A:
FIGS. 5A-5B illustrate an embodiment of an arrangement of image grids used in detection.
Figure 5B:
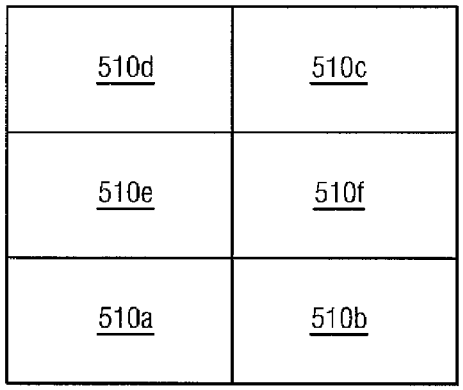

FIGS. 5A-5B illustrate an embodiment of an arrangement of image grids used in a system for detection. In FIG. 5A, four image grids 510 are created to match the size and location of a corresponding search grid of a minefield. In FIG. 5B, six image grids 510 are created from the data detected in the same four search grids used to create the image grids of FIG. 5A. However, in FIG. 5B, two image grids 510e and 510f are created from the detection data from two adjacent search grids. Image grid 510e is created using the data from the search grids corresponding to image grids 510a and 510d and image grid 510f is created using the data from the search grids corresponding to image grids 510b and 510c. Image grids 510e and 510f may be used to identify lines that are not present in a detectable amount in any one search grid. For example, a pattern line of detections might span the search grids corresponding to image grids 510a and 510d. However, the pattern line may not be present in a detectable amount in either 510a or 510d. The use of image grid 510e may allow for such a pattern line to be detected.

Figure 6:
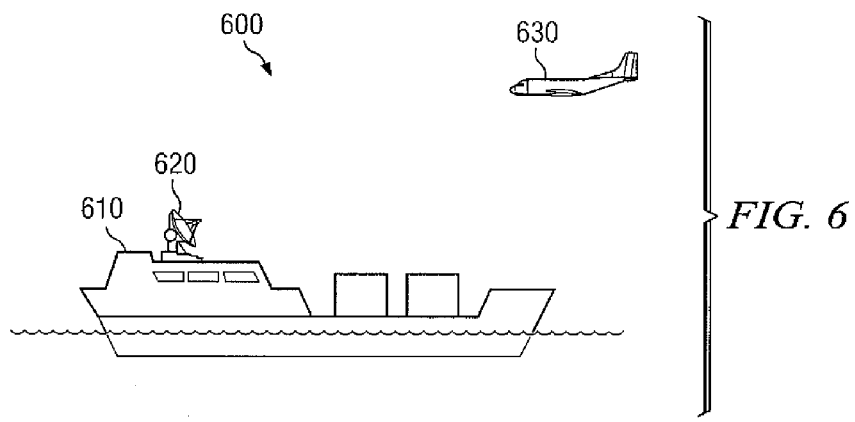
FIG. 6 illustrates an environment in which one embodiment of a system of using image grids in detection of discrete objects may operate.

FIG. 6 illustrates an environment 600 in which one embodiment of a system of using image grids for detection of fast moving radar target may operate. Generally, ship 610 carries a radar antenna 620 to measure the range and azimuth of a fast-moving target 630. The radar antenna 620 measures detections of the target 630 at a variety of times. Each detection is displayed as a location on a radar display, such as a Plan Position Indicator. For certain targets, one can measure the displacement of the detections to calculate the velocity of the target 630. However, for fast-moving targets, such as target 630, such measurement is difficult, as the field of detections is too wide.

Figure 7:
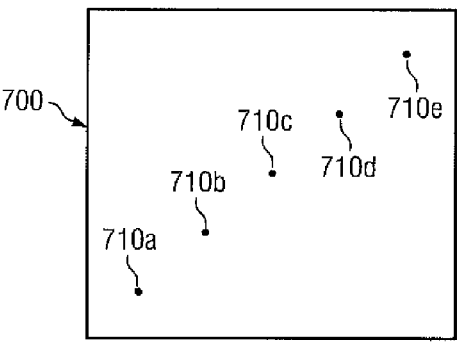
FIG. 7 illustrates an embodiment of an image grid that may be used in detection of discrete objects.

FIG. 7 illustrates an embodiment of an image grid that may be used in a system for detection of a discrete object in the environment illustrated in FIG. 6. As radar antenna 620 detects target 630 over time, detections 710 appear on a display. A processor can maintain the image shown on a corresponding image grid for as long as needed to detect a fast-moving target 630. Thus, over time, detections appear as marks 710a-710e on image grid 700. After a sufficient number of detections are made, a processor can identify a line of marks 710 using an image processing algorithm such as a Hough transform. Using the slope and y-intercept of the identified line, one may be able to determine where the fast-moving target 630 is headed or came from. Thus, image grid 700 provides a data structure for collecting persistent detections over a wide field of view that may be able to be used to determine the direction of travel of target 630.

Although the present disclosure and its advantages have been described in detail, it should be understood that various changes, substitutions, and alterations can be made therein without departing from the spirit and scope of the disclosure as defined by the appended claims. Any suitable logic comprising software, hardware, other logic, or any suitable combination of the preceding may perform the functions described. The logic may be embodied on a computer readable medium and may operate on one or more computers.

What is claimed is:

1. A method, executed by one or more processors, for using image grids in detection of discrete objects, comprising:
   using a sensor to identify detections in a search grid, wherein one or more of the detections are false alarms and one or more of the detections are objects of interest;
   creating an image grid of the detections;
   analyzing the image grid to identify one or more pattern lines of detections of discrete objects; and
   identifying the objects of interest using the identified pattern lines of detections of the discrete objects.

2. The method of claim 1, wherein analyzing the image grid to identify a pattern of detections comprises: performing a Hough transform on the image grid.

3. The method of claim 1, wherein the pattern of detections is linear.

4. The method of claim 1, wherein the detections represent the locations of a target at different points in time.

5. The method of claim 4, further comprising:
   predicting a direction of travel of the target.

6. The method of claim 1, further comprising:
   dividing a field of interest into one or more search grids, wherein creating an image grid of the detections comprises creating an image grid from the detections found in one or more search grids; and
   investigating the area of the search grid corresponding to each identified pattern to confirm whether each detection is an object of interest and to identify other objects of interest within the identified pattern.

7. The method of claim 6, wherein investigating each identified pattern to confirm whether each detection is an object of interest comprises:
   using a second sensor to confirm whether each detection is an object of interest.

8. The method of claim 1, further comprising:
   adjusting the size of the image grid based on one or more of the resolution of the sensor, the false alarm rate of the sensor, and the processing power needed to analyze the image grid.

9. A system for using image grids in detection of discrete objects, comprising:
a sensor operable to identify detections in a search grid, wherein one or more of the detections are false alarms and one or more of the detections are objects of interest;
a processor operable to create an image grid of the detections and analyze the image grid to identify one or more pattern lines of detections of discrete objects; and
the processor further operable to identify the objects of interest using the identified pattern lines of detections of the discrete objects.

10. The system of claim 9, wherein:
the processor is operable to perform a Hough transform on the image grid to analyze the image grid to identify a pattern of detections.

11. The system of claim 9, wherein the pattern of detections is linear.

12. The system of claim 9, wherein the detections represent the locations of a target at different points in time.

13. The system of claim 12, wherein:
the processor is further operable to predict a direction of travel of the aircraft.

14. The system of claim 9, wherein:
the sensor is operable to identify detections in one or more search grids, wherein the search grids comprise divisions of a field of interest, and wherein the processor is operable to create image grids from the detections found in the one or more search grids, and further comprising:
a second sensor operable to investigate the area of the search grid corresponding to each identified pattern to confirm whether each detection is an object of interest and to identify other objects of interest within the identified pattern.

15. The system of claim 9, wherein:
the processor is further operable to adjust the size of the image grid based on one or more of the resolution of the sensor, the false alarm rate of the sensor, and the processing power needed to analyze the image grid.

16. A non-transitory computer readable medium including logic for using image grids in detection of discrete objects, the logic operable to:
use a sensor to identify detections in a search grid, wherein one or more of the detections are false alarms and one or more of the detections are objects of interest;
create an image grid of the detections;
analyze the image grid to identify one or more pattern lines of detections of discrete objects; and
identify the object of interest using the identified pattern lines of detection of the discrete objects.

17. The non-transitory computer readable medium of claim 16, wherein analyzing the image grid to identify a pattern of detections comprises:
performing a Hough transform on the image grid.

18. The non-transitory computer readable medium of claim 16, wherein the pattern of detections is linear.

19. The non-transitory computer readable medium of claim 16, wherein the detections represent the locations of a target at different points in time.

20. The non-transitory computer readable medium of claim 19, the logic further operable to:
predict a direction of travel of the target.

21. The non-transitory computer readable medium of claim 16, the logic further operable to:
dividing a field of interest into one or more search grids, wherein creating an image grid of the detections comprises creating an image grid from the detections found in one or more search grids; and
investigating the area of the search grid corresponding to each identified pattern to confirm whether each detection is an object of interest and to identify other objects of interest within the identified pattern.

22. The non-transitory computer readable medium of claim 21, wherein investigating each identified pattern to confirm whether each detection is an object of interest comprises:
using a second sensor to confirm whether each detection is an object of interest.

23. The non-transitory computer readable medium of claim 16, the logic further operable to perform the step of:
adjusting the size of the image grid based on one or more of the resolution of the sensor, the false alarm rate of the sensor, and the processing power needed to analyze the image grid.

* * * * *